United States Patent [19]
Leuthold et al.

[11] Patent Number: 5,908,247
[45] Date of Patent: Jun. 1, 1999

[54] SINUSOIDAL GROOVING PATTERN FOR GROOVED JOURNAL BEARING

[75] Inventors: Hans Leuthold; David John Jennings, both of Santa Cruz; Lakshman Nagarathnam, Milpitas; Alan Grantz, Aptos; Steve Parsoneault, Watsonville, all of Calif.

[73] Assignee: Seagate Technology, Inc., Scotts Valley, Calif.

[21] Appl. No.: 08/836,508

[22] PCT Filed: Nov. 14, 1994

[86] PCT No.: PCT/US94/13136

§ 371 Date: Aug. 22, 1997

§ 102(e) Date: Aug. 22, 1997

[87] PCT Pub. No.: WO96/15381

PCT Pub. Date: May 23, 1996

[51] Int. Cl.⁶ ...................................................... F16C 32/06
[52] U.S. Cl. ............................................ 384/114; 384/107
[58] Field of Search ..................................... 384/100, 107, 384/108, 109, 110, 111, 112, 113, 114, 115, 116, 117, 118, 119, 120, 291, 292

[56] References Cited

U.S. PATENT DOCUMENTS

| | | | |
|---|---|---|---|
| 3,602,555 | 8/1971 | Hendler | 384/115 |
| 3,726,572 | 4/1973 | Beardmore | 384/113 |
| 4,961,122 | 10/1990 | Sakai et al. | 360/107 |

*Primary Examiner*—Thomas R. Hannon
*Attorney, Agent, or Firm*—Flehr Hohbach Test Albritton & Herbert LLP

[57] ABSTRACT

A bearing having two surfaces (60, 72) rotatable with respect to each other, a lubrication medium located in a gap between the tow surfaces during rotation of the bearing and a sinusoidal groove pattern (20) formed on one of the tow surfaces to distribute the lubrication medium over the surface of the bearing and create a pressure distribution in the bearing to create a stiff hydrodynamic bearing.

7 Claims, 4 Drawing Sheets

SINUSOIDAL GROOVING PATTERN FOR GROOVED JOURNAL BEARING

CROSS-REFERENCE TO RELATED APPLICATION

This application is related to and may be used in common with the invention disclosed in Ser. No. 08/279,195, Jul. 22, 1994, entitled Hub Disc Assembly with Integrated Air Bearing, inventor H. Leuthold, et al., as well as Ser. No. 08/279,199, Jul. 22, 1994, now U.S. Pat. No. 5,533,812 issued Jul. 9, 1996, entitled Single Plate Hydrodynamic Bearing with Self Balancing Fluid Level, inventor Hans Leuthold, et al. and Ser. No. 08/278,754, Jul. 22, 1994, now U.S. Pat. No. 5,487,608 issued Jan. 30, 1996, entitled Single Plate Hydrodynamic Bearing with Self Balancing Fluid Level and Fluid Circulation, inventor Hans Leuthold, et al., and Ser. No. 08/279,194, Jul. 22, 1994, now U.S. Pat. No. 5,520,038, issued May 28, 1996, entitled Sleeve Grooving Tool, inventor Clark et al., all of said applications being assigned to the assignee of the present invention and incorporated herein by reference.

FIELD OF THE INVENTION

Present invention relates to the field of hydrodynamic bearing assemblies which provide support during rotation of a high speed spindle element. More specifically, the present invention relates especially to the use of a hydrodynamic bearing assembly for utilization in an information recording system.

BACKGROUND OF THE INVENTION

Disc drive memory systems have been used in computers for many years for storage of digital information. Such information is recorded on concentric memory tracks of a magnetic disc medium, the actual information being stored in the form of magnetic transitions within the medium. The discs themselves are rotatably mounted on a spindle, the information being accessed by means of read write heads supported on a pivoting arm which moves radially over the surface of the disc. The read write heads or transducer must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in hub or in spindle motor. Such in spindle motors typically have a spindle mounted by means of ball bearing systems to a motor shaft disposed in the center of the hub. However, with the decreasing size of information storage systems, other types of bearings including hydrodynamic bearings are being developed. Useful designs are disclosed in the incorporated applications.

In these types of bearings, a lubricating fluid functions as the actual bearing surface between a stationary base or housing and the rotating spindle or hub and the surrounding stationary portion of the motor. These fluids, either gas or liquid must be sealed within the bearing to avoid loss of the lubricant which would result in reduced bearing load capacity. Otherwise, the physical surfaces of the spindle and housing would contact one another, leading to increased wear and eventual failure of the bearing system. Equally seriously, loss of the seal or failure to control the lubricant level within the bearing system could cause contamination of the hard disc drive with lubricant particles and droplets or outgassing related contamination.

A further critical issue is the need to maintain the stiffness of the hydrodynamic bearing. The stiffer the bearing, the higher the natural frequencies in the radial and axial direction, so that the more stable is the track of the disc being rotated by a spindle on which reading and writing must occur. Thus the stiffness of the bearing in the absence of any mechanical contact between its rotating part becomes critical in the design of the bearing so that the rotating load can be stably and accurately supported on the spindle without wobble or tilt.

A typical prior art grooving pattern is shown in FIG. 1. This pattern was adopted having a constant grooving angle α which is the angle defined by the groove and the circumference of the cylindrical surface as a constant angle. The pattern provides points of high pressure 10 to seek to optimize the stiffness of the bearing, while providing the desired pumping action of the lubricant to maintain the lubricant surface covered with fluid while minimizing the possibilities of fluid escape. However, because of the sharp angles, at the corners, the grooves are difficult to form, and the tools used to form the grooves wear out quickly.

SUMMARY OF THE INVENTION

It is an objective of the present invention to provide a hydrodynamic bearing which is simple and scalable in design and manufacture, and highly reliable in use.

It is a further objective of the invention to provide a hydrodynamic bearing in which the pressure distribution along the surface of the bearing is optimized in order to maximize the stiffness of the bearing.

It is a further objective of the invention to provide a stiffer hydrodynamic bearing which is especially useful in information in rotating disc information stored systems and the like.

A further related objective of the invention is to provide a grooving pattern on the bearing which is easier to define and can be reliably and repeatedly formed on the bearing surface without undue wear on the grooving tool.

In summary, the present invention provides a hydrodynamic bearing characterized in that the continuous grooving pattern along the axis of rotation is designed to have a maximum pumping effect at the bearing boundaries, and an overall optimized load carrying capability independent of journal length and radius. This is achieved by providing a sinusoidal grooving pattern having a grooving angle which varies such that the center line of a groove lies on a sinusoidal half period. In other words, by the use of a sinusiodal pattern, there are no sharp peaks or points where the groove changes direction, but rather where the grooves change direction a circular segment is formed so that the surface groove forms a sinusoid. The result of the adoption of such a pattern is to provide for a greater pressure distribution along the axis of rotation while reducing the total amount of surface area which the grooves actually occupy.

The invention will be described more fully below with reference to the drawings.

DESCRIPTION OF THE PREFERRED EMBODIMENT

Referring first again to FIG. 1, this figure shows a conventional grooving pattern along the axis of rotation of the shaft. It can be seen as already explained above, that the grooving angle α formed by each groove 12 and the axis of rotation 14 of the cylindrical surface is constant. It can further be seen that the corners where the groove changes direction are sharp, and difficult to form with grooving tools presently in use.

Figure 2:
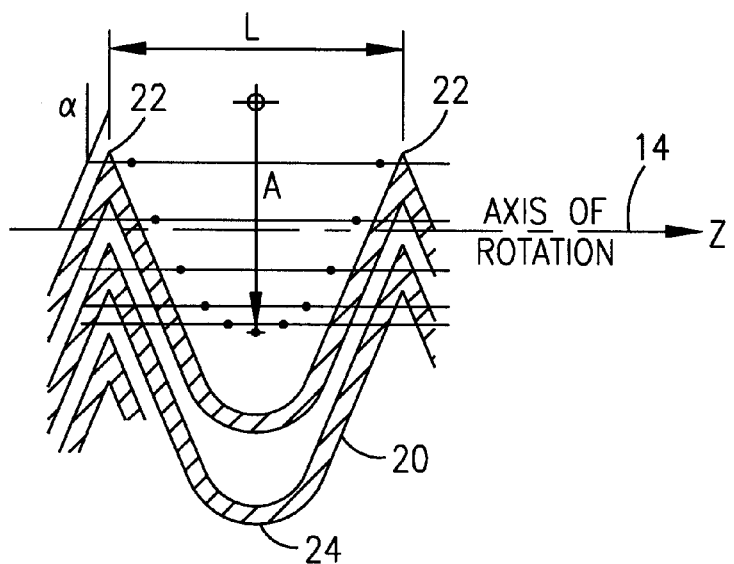
FIG. 2 illustrates the sinusoidal grooving pattern of the present invention.

In contrast, an example of the sinusoidal grooving pattern of the present invention is shown in FIG. 2. As illustrated in this figure, the grooving angle a which is the angle between the groove 20 and the axis of rotation 14 of the hydrodynamic bearing varies such that the center line of the groove lies on a sinusoidal half periods (equal to the absolute value of a sinusoid). In this example, only the central portion of the pattern is a sinusoid. This provides the advantage of increased lift force in the bearing, because of the reduction in surface area occupied by the grooves while maintaining fluid distribution. This reduction in surface area is clearly illustrated. In this example, the end portions of the groove pattern are substantially linear.

It should further be noted that the grooved surface can either be on the shaft, or on the surface facing the shaft, and that either the shaft or the bearing surface surrounding it may be the rotating surface. It is the relative rotation of the two surfaces which creates the pumping action which distributes the lubricant between the two surfaces to create the pressure between the surfaces and establish the stiffness and load carrying capacity of the hydrodynamic bearing.

Figure 3:
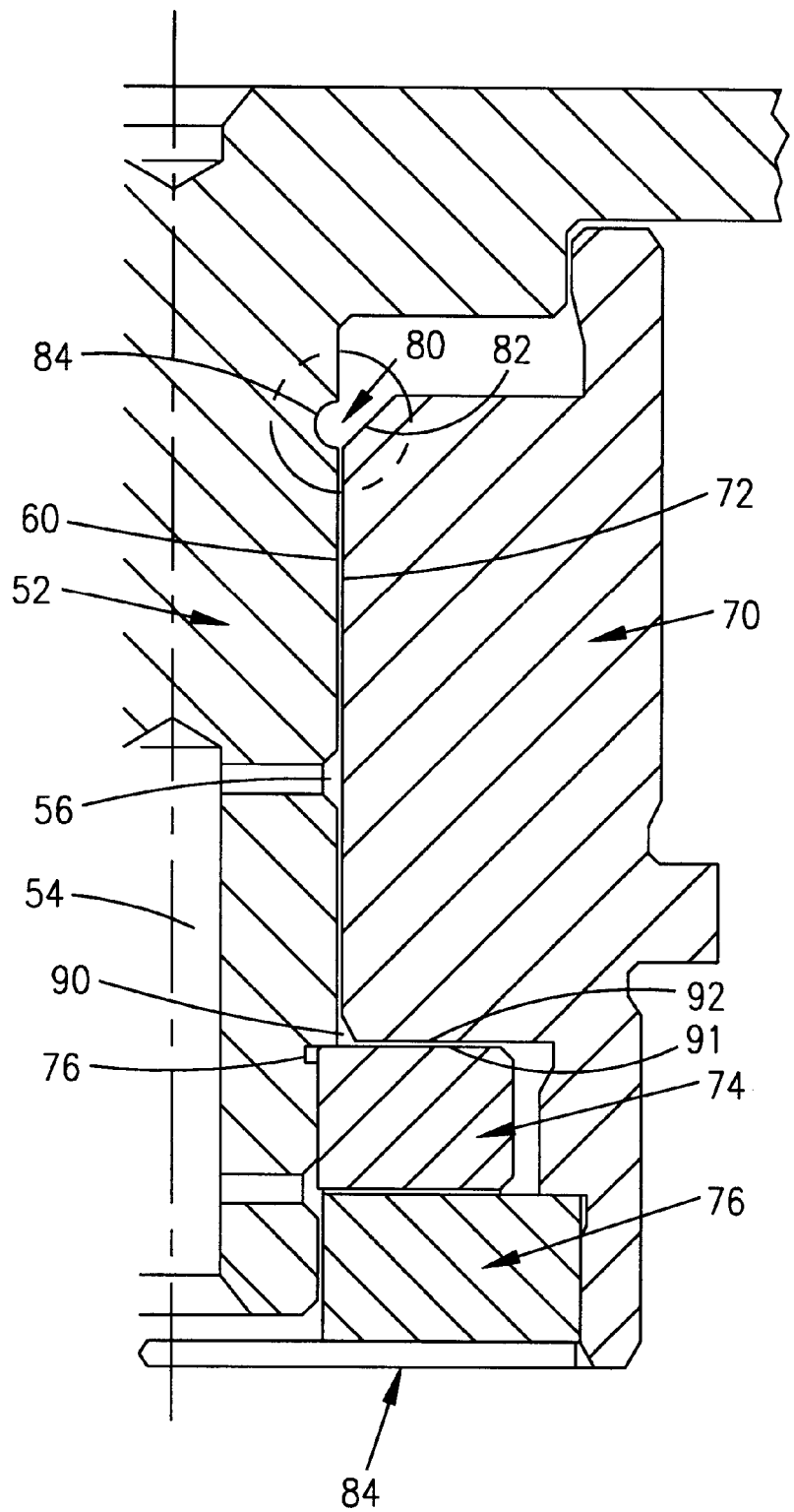
FIG. 3 is a vertical sectional view of a portion of a motor incorporating a hydrodynamic bearing with which the present grooving pattern is useful.

FIG. 3 illustrates a motor in which the present groove design may be utilized. Obviously, use of the design is not limited to motors of the type shown in FIG. 3.

FIG. 3 includes a shaft 52 which is rotating past a fixed bushing 70. The rotating shaft 52 includes a reservoir 54 which supplies fluid through a groove 56 to the surface of the hydrodynamic bearing. The hydrodynamic bearing itself is formed between the two relatively rotating surfaces 60, 72. The upper end of the bearing terminates in a region generally indicated at 80 where the incline surface 82 slopes away from the recess 84 in the surface 60 to form a meniscus which will hold the fluid within the bearing. The lower end of the bearing terminates at a region 90 where the rotating shaft joins a thrust plate 74, the surface 60 including a recess 76 for enabling the joining of the thrust plate to the rotating shaft. The thrust plate 74 includes a surface 91 facing a surface 92 across a gap to form a thrust bearing.

Figure 4:
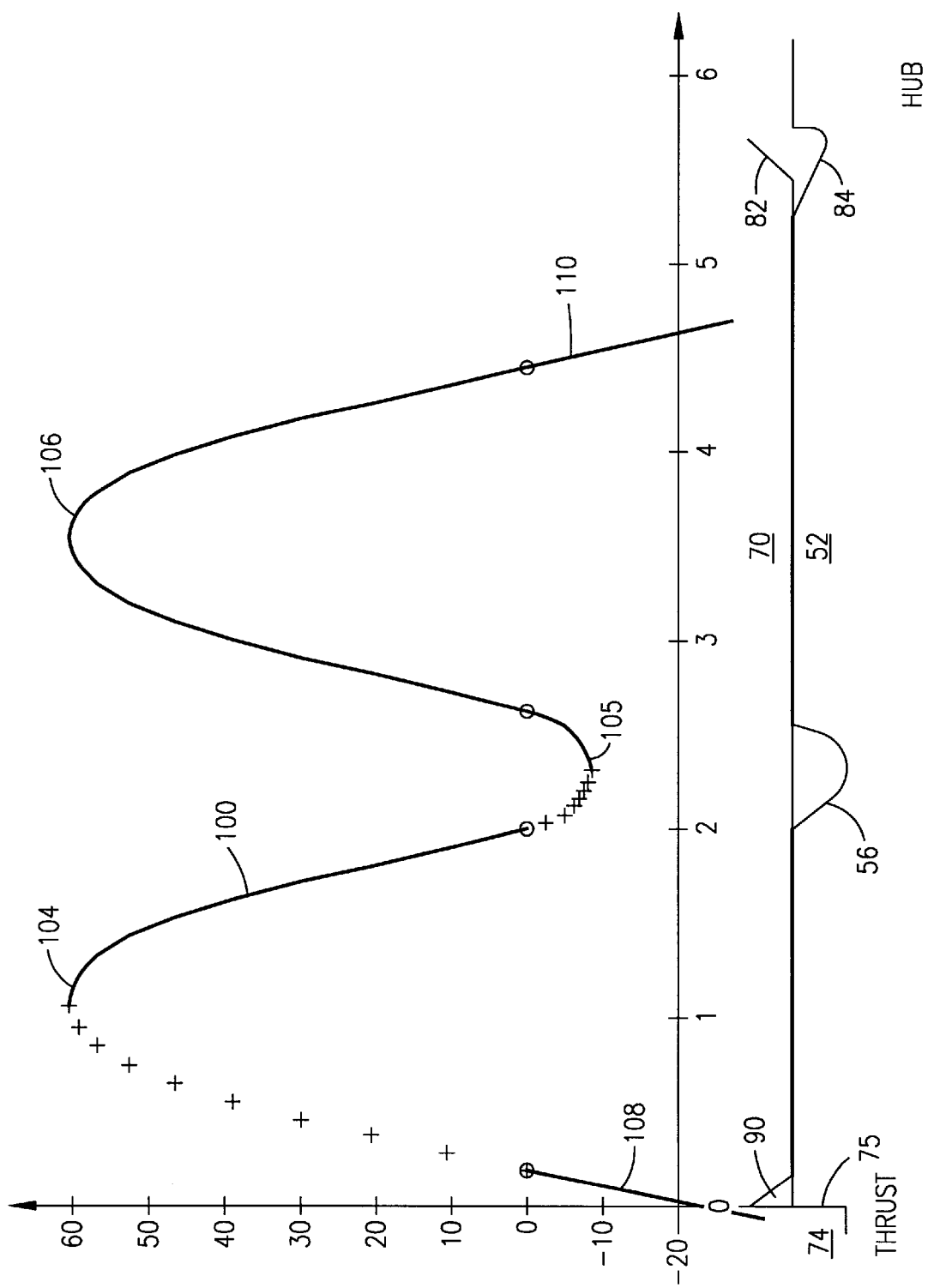
FIG. 4 illustrates the relative placement of the sinusoidal grooving pattern relative to the structure of the motor of FIG. 3.

FIG. 4 is an illustrative embodiment of the application of the sinusoidal group pattern of the present invention to the bushing 70 which faces the shaft 52. The significant portions of the rotating shaft 52 and thrust plate 70 are labeled, especially the angled surface 82 which together with the recess 84 defines the open end of the hydrodynamic bearing, and the region 90 which is defined by thrust plate 74 and recess 75 to denote the closed end of the bearing. The distribution of the sinusoidally curved grooving pattern across the surface in this case of the bushing 70 is illustrated by the sine curve 100 of FIG. 4 which has a lower circular segment 105 which is positioned to be immediately adjacent the lubricant providing groove 56 and defined there by the region of lowest pressure within the hydrodynamic bearing. The regions of highest pressure will be at the curved segments which are the high points of the curve generally indicated in this figure by 104, 106. The end points of the sinusoidal pattern are indicated at the thrust bearing end 108 and the hub supporting end 110. The only difference between the patterns at the ends of the bearing is that a sufficient extension of the pattern at the open support end 110 will be provided to urge the lubricant toward the center of the hydrodynamic bearing to prevent the lubricant from exiting the bearing region. In contrast, at the lower end 108, where the shaft meets the thrust plate, a region of equal pressure 90 is desirably defined so that equal distribution of the fluid across the surface of the hydrodynamic bearing is achieved and maintained.

This pattern of grooves may be provided either on the rotating shaft, or on the stationary surface facing the rotating shaft. In either event, the pattern will serve to both create pressure between the rotating surface and the fixed surface, and to maintain the fluid within the gap between the rotating and fixed surfaces, without causing the lubricant to be ejected. The radial load carrying capacity of the bearing is established by the hydrodynamic lubricant pressure established between the grooved surface and the ungrooved surface.

Figure 1:
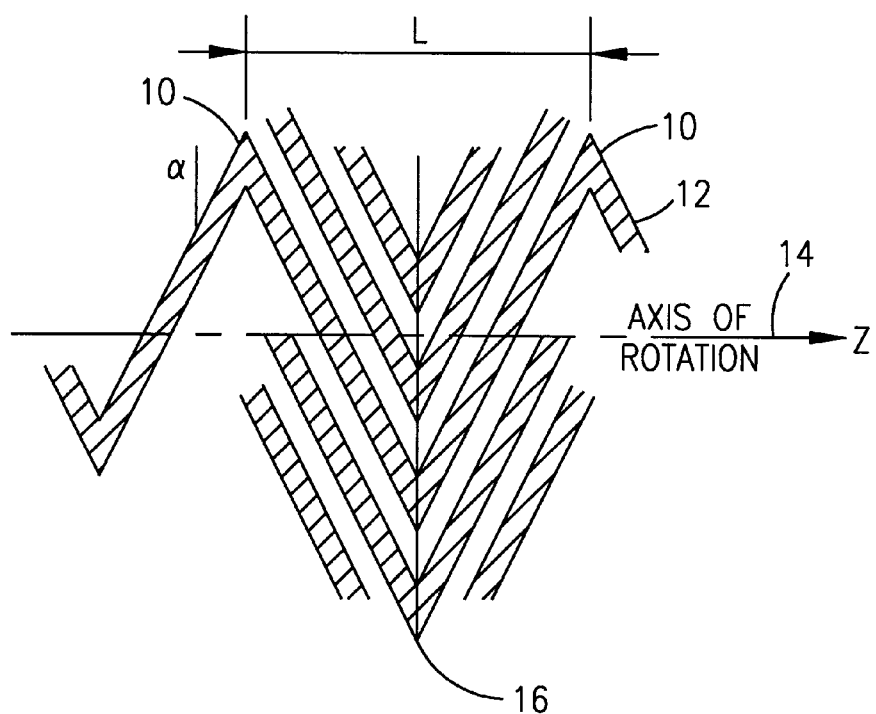
FIG. 1 illustrates a conventional grooving pattern used in hydrodynamic bearings.

It should further be noted that in a hydrodynamic bearing utilizing the grooving pattern of FIG. 1, that the points of lowest pressure are the peaks 10 while the point of highest pressure are the peaks 16. In contrast, using a sinusoidal groove pattern as shown in FIG. 4, the highest pressure region will again be in the regions 104, 106 where the grooves are the highest, while the region of lowest pressure will be in the area 105 where the groove is the lowest. But the pressure distribution because of the use of sinusoidal pattern rather than a straight line pattern will not be as dramatic as the pressure distribution with the conventional grooving pattern of FIG. 1. That is, the difference in pressure between the regions 104, 106 of highest pressure and the region 105 of lowest pressure will be smaller than with the conventional grooving pattern. This smaller pressure difference, however, will be applied to a much increased bearing land area, resulting in a much higher lift force. That is, there will be more flat, ungrooved surface facing the opposing, relatively rotating surface than with the straight line grooving pattern of FIG. 1. It is this ungrooved surface or land, which creates the lift force resulting from the pressure between the two relatively rotating surfaces thus defining the stability or stiffness of the bearing design.

Figure 5:
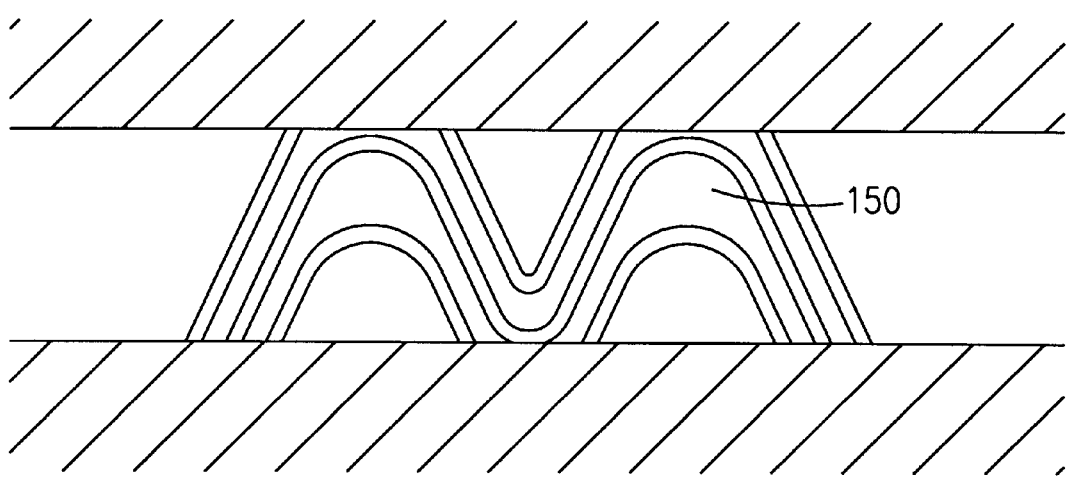
FIG. 5 illustrates the groove pattern imposed on a motor shaft.

A review of FIG. 5 illustrates two of the advantages of the present invention. The first is that it is far easier to make the grooves of this invention with this sinusoidal pattern, compared to the grooves of FIG. 1 which terminate each line in a sharp point and immediate reversal. Clearly, the use of known grooving tools would render such sharp reversal grooves difficult to make, and would cause a very short lifetime to be available for such grooving tools. Secondly, it is also apparent from a review of this figure that a considerably larger ungrooved area 150 between the grooves is available than in the case of the straight line grooves. It has been found that while the pressure does not reach quite as high a level at the highest points of the grooves as it does with the straight line grooves, it is still highly effective, and the increased land or ungrooved area using this embodiment significantly increase the overall pressure within the hydrodynamic bearing dramatically increasing the stiffness of the bearing. Therefore, it is believed that this bearing grooving pattern will be highly efficient in creating a stable hydrodynamic bearing system especially for use in disc drives and the like. The grooving pattern herein is described as sinusoidal, as this is the preferred format. However other grooved patterns where the transition regions are curved are also possible and would achieve some of the benefits of this invention and are intended to be within the scope of this invention.

Other features and advantages of the present invention may become apparent to a person of skill in the art who studies the present invention disclosure. Therefore, the scope of the invention is to be limited only by the following claims.

What is claimed is:

1. A hydrodynamic bearing having two surfaces rotatable with respect to each other, a lubricating medium located in a gap between the two surfaces during rotation of the bearing, and a sinusoidal groove pattern formed on one of said two surfaces to distribute the lubricating medium over the surface of the bearing and create a pressure distribution in said bearing to create a stiff hydrodynamic bearing wherein each groove of said groove pattern comprises a sine segment.

2. A hydrodynamic bearing as claimed in claim 1 wherein said sinusoidal groove pattern is formed on a first of said surfaces rotating with respect to a second of said surfaces.

3. A hydrodynamic bearing as claimed in claim 1 wherein said sinusoidal groove pattern is formed on a first of said surfaces stationary with respect to a second of said surfaces which is rotating.

4. A hydrodynamic bearing as claimed in claim 1 wherein only a portion of each groove of said groove pattern along said groove surface forms said sine segment, any remainder of each said groove being substantially linear.

5. A hydrodynamic bearing as claimed in claim 1 wherein said sinusoid pattern has low points for establishing low pressure regions at an upper and lower end of said bearing and at about a center of said bearing, only said low point at said bearing center defining said sine segment.

6. An axial bearing as claimed in claim 5 wherein said sinusoid defines said sine segment at a high pressure region between each of said pressure regions.

7. A hydrodynamic bearing having two surfaces rotatable with respect to each other, a lubricating medium located in a gap between the two surfaces during rotation of the bearing, and a groove pattern formed on one of said two surfaces to distribute the lubricating medium over the surface of the bearing and create a pressure distribution in said bearing, the groove pattern being characterized by the absence of abrupt changes in direction, as well as by a smaller fraction of grooved bearing surface in areas of higher pressure in said pressure distribution, and wherein a substantial part of each groove of the grooving pattern is sinusoidal and any remainder of each said groove is substantially linear.

* * * * *